United States Patent
Gupta et al.

(10) Patent No.: US 11,875,597 B2
(45) Date of Patent: Jan. 16, 2024

(54) METHOD FOR VERIFYING THE IDENTITY OF A USER BY IDENTIFYING AN OBJECT WITHIN AN IMAGE THAT HAS A BIOMETRIC CHARACTERISTIC OF THE USER AND MOBILE DEVICE FOR EXECUTING THE METHOD

(71) Applicant: Identy Inc., Dover, DE (US)

(72) Inventors: Hardik Gupta, Jabalpur (IN); Satheesh Murugan, Ramapurum (IN)

(73) Assignee: Identy Inc., Dover, DE (US)

( * ) Notice: Subject to any disclaimer, the term of this patent is extended or adjusted under 35 U.S.C. 154(b) by 38 days.

(21) Appl. No.: 17/425,128

(22) PCT Filed: Jan. 22, 2020

(86) PCT No.: PCT/IB2020/050494
§ 371 (c)(1),
(2) Date: Jul. 22, 2021

(87) PCT Pub. No.: WO2020/152599
PCT Pub. Date: Jul. 30, 2020

(65) Prior Publication Data
US 2022/0114808 A1    Apr. 14, 2022

(30) Foreign Application Priority Data
Jan. 24, 2019 (EP) .................... 19153461

(51) Int. Cl.
*G06V 40/12* (2022.01)
*G06V 10/82* (2022.01)
(Continued)

(52) U.S. Cl.
CPC ........ *G06V 40/1353* (2022.01); *G06V 10/255* (2022.01); *G06V 10/82* (2022.01);
(Continued)

(58) Field of Classification Search
CPC .... G06V 40/1353; G06V 40/10; G06V 10/82; G06V 40/161; G06V 40/193; G06V 10/255
See application file for complete search history.

(56) References Cited

U.S. PATENT DOCUMENTS 10,339,362 B2 * 7/2019 Othman ............. G06V 40/1359
11,341,222 B1 * 5/2022 Caffey .................. H04W 12/06
(Continued)

OTHER PUBLICATIONS

U. Mahbub, S. Sarkar, V. M. Patel and R. Chellappa, "Active user authentication for smartphones: A challenge data set and benchmark results," 2016 IEEE 8th International Conference on Biometrics Theory, Applications and Systems (BTAS), Niagara Falls, NY, USA, 2016, pp. 1-8 (Year: 2016).*
(Continued)

*Primary Examiner* — Utpal D Shah
(74) *Attorney, Agent, or Firm* — Lowenstein Sandler LLP

(57) ABSTRACT

A method includes obtaining, by a processing device from an optical sensor of a mobile device, an image, processing, by the processing device, the image by using a neural network to identify a position of an object in the image and the object in the image, thereby obtaining an identified object, after processing the image, extracting, by the processing device from the identified object, a biometric characteristic, and providing, by the processing device, at least the biometric characteristic as input to determine whether the biometric characteristic identifies a user.

18 Claims, 7 Drawing Sheets

(51) Int. Cl.
G06V 10/20 (2022.01)
G06V 40/10 (2022.01)
G06V 40/16 (2022.01)
G06V 40/18 (2022.01)

(52) U.S. Cl.
CPC ............ *G06V 40/10* (2022.01); *G06V 40/161* (2022.01); *G06V 40/193* (2022.01)

(56) References Cited

U.S. PATENT DOCUMENTS

| | | | |
|---|---|---|---|
| 2018/0165508 A1* | 6/2018 | Othman | G06F 21/32 |
| 2020/0175334 A1* | 6/2020 | Zhang | G06F 18/217 |
| 2022/0383663 A1* | 12/2022 | Gupta | G06V 10/25 |

OTHER PUBLICATIONS

Aronowitz, Hagai, et al. "Multi-modal biometrics for mobile authentication." IEEE International Joint Conference on Biometrics. IEEE, 2014. (Year: 2014).*
Office Action for JP Application No. 2021-542315, dated Oct. 11, 2022, 3 pages.
Sehgal, Abhishek, Kehtanavaz, Nasser, "Guidelines and Benchmarks for Deployment of Deep Learning Models on Smartphones as Real-Time Apps", https://arxiv.org/ftp/arxiv/papers/1901/1901.02144. pdf, Jan. 8, 2019, pp. 1-10.
Lane, Nicholas D., et al.: "Squeezing Deep Learning into Mobile and Embedded Devices", IEEE Pervasive Computing, vol. 16, No. 3, pp. 82-88, Jul. 27, 2017, ISSN: 1536-1268, DOI: 10.1109/MPRV. 2017.2940968.
Jiaxiang, Wu, et al.: "Quantized Convolutional Neural Networks for Mobile Devices", May 16, 2016, pp. 1-11, ISBN: 978-1-4673-8851-1, https://arxiv.org/pdf/1512.06473.pdf.
EP Communication dated Nov. 29, 2021 re EP Application No. 19153461.9, 7 pages.
European Patent Office Communication pursuant to Article 94(3) for European patent application No. 19153461.9 dated Dec. 7, 2022, 6 pages.

Anonymous: "An On-device Deep Neural Network for Face Detection"; Computer Vision, Methods and Algorithms, Machine Learning Research; Nov. 2017, pp. 1-7, XP093003749, downloaded from https://machinelearning.apple.com/research/face-detection on Nov. 30, 2022.
Ajita, Rattani et al.: "A Survey Of mobile face biometrics", Computers and Electrical Engineering, Sep. 2018, pp. 39-52, vol. 72, XP085556315, ISSN: 0045-7906, DOI: 10.1016/J.COMPELECENG. 2018.09.05.
Andrew G Howard et. al.: "MobileNets: Efficient Convolutional Neural Networks for Mobile Vision Applications", arXiv.org, Apr. 17, 2017, pp. 1-9, XP055556718, URL:https://arxiv.org/pdf/1704. 04861.pdf.
EP Communication pursuant to Article 94(3) EPC for EP Application No. 19153461.9, dated Jun. 9, 2022, 6 pages.
The Extended EP Search Report for EP Application No. 19153461. 9, dated Jul. 29, 2019, 10 pages.
Jha, et al., "UBSegNet: Unified Biometric Region of Interest Segmentation Network", arxiv.org, Cornell University Library, Sep. 26, 2017, 6 pages.
Severo, et al., "A Benchmark for Iris Location and a Deep Learning Detector Evaluation", arxiv.org, Cornell University Library, Mar. 3, 2018, 7 pages.
Redmon, et al., "You Only Look Once: Unified, Real-Time Object Detection", May 9, 2016, pp. 1-10, Retrieved from the Internet: URL:https://arxiv.org/pdf/1506.02640.pdf, [retrieved on Feb. 14, 2019].
Redmon, Joseph, Farhadi, Ali, "YOLO9000: Better, Faster, Stronger", Dec. 25, 2016, pp. 1-9, Retrieved from the Internet: URL:https:// arxiv.org/pdf/1612.08242.pdf, [retrieved on Feb. 14, 2019].
Widyastuti, Rifka, Yang, Chuan-Kai, "Cat's Nose Recognition Using You Only Look Once (Yolo) and Scale-Invariant Feature Transform (SIFT)", 2018 IEEE 7th Global Conference on Consumer Electronics (GCCE), IEEE, Oct. 9, 2018, pp. 55-56, [retrieved on Dec. 12, 2018].
PCT International Search Report and Written Opinion for Application No. PCT/IB2020/050494, dated May 25, 2020, 10 pages.
Office Action for KR Application No. 10-2021-7026927, dated Jul. 20, 2023, 11 pages.

* cited by examiner

METHOD FOR VERIFYING THE IDENTITY OF A USER BY IDENTIFYING AN OBJECT WITHIN AN IMAGE THAT HAS A BIOMETRIC CHARACTERISTIC OF THE USER AND MOBILE DEVICE FOR EXECUTING THE METHOD

RELATED APPLICATIONS

This application claims the benefit of International Application No. PCT/IB2020/050494, filed Jan. 22, 2020, which claims priority to European Application No. EP19153461.9, filed Jan. 24, 2019. The entire contents of both applications are hereby incorporated by reference.

TECHNICAL FIELD

Aspects of the present invention relate to a method for identifying a user using an object in an image having a biometric characteristic that identifies the user and a mobile device adapted to execute a corresponding method.

BACKGROUND

Image recognitions in general are widespread and allow for a plurality of applications. For example, recognizing specific persons and faces or objects within images is used by social networks and other media in an excessive manner. Furthermore, in more recent smartphones, identification technologies are used for identifying users by, for example, fingerprint-sensors. This technology is used to not only determine that a user is present but to also authorize the user by identifying the fingerprint with high accuracy.

Previous techniques can require a significant amount of computer resources in order to achieve identification of objects within images irrespective of whether they use "brute force" or newer networks that are specifically trained for identifying objects.

More recently, however, the "You Only Look Once" technology was provided that allows for significantly faster yet reliable identification of objects within images. The basic principles of this technology are explained in the papers "You Only Look Once: Unified, Real-Time Object Detection" by Redmon et al. and "YOLO9000: Better, Faster, Stronger" by Redmon et al.

The basic concept of the "You Only Look Once" technology (referred to herein as "YOLO technology") is to separate an obtained image into grids and identify objects within one or more of the grid cells by using a trained neural network that comprises a plurality of reduction layers and convolutional layers that each process the obtained image.

While neural networks can obtain appropriate results also while performing real-time detection, even for moving images (videos) for a plurality of objects, it turns out that, for other identifications of very specific objects, like faces or the palm of the hand of a user, neural networks are not yet properly adapted. This results in a longer time being required to identify the objects.

Additionally, due to the comparably complex neural network, significant computer resources can be required in order to allow for real-time identification of objects which, additionally, makes the application of the YOLO technology not suitable for mobile devices like smartphones and tablets.

In view of the above, it would be advantageous to provide methods and systems that allow for quickly identifying users while providing significant detection accuracy and, at the same time, simplifying the interaction of the user with the mobile device used for identification. Further, it would be advantageous to reduce required computer resources for the identification such that the identification can be implemented in present generation mobile devices.

SUMMARY

In one embodiment, a method comprises: obtaining, by a processing device from an optical sensor of a mobile device, an image; processing, by the processing device, the image by using a neural network to identify an object in the image and a position of the object in the image, thereby obtaining an identified object; after processing the image, extracting, by the processing device from the identified object, a biometric characteristic; and storing, by the processing device, the biometric characteristic in a storage device and/or providing, by the processing device, at least the biometric characteristic as input to determine whether the biometric characteristic identifies a user.

Herein, the storage device can be associated with the mobile device itself or a remote storage device that is provided outside the mobile device. For example, the storage device may be a storage device associated with a server of a company to which the biometric characteristic is to be forwarded via data transfer means like mobile internet or other transfer means.

Providing the biometric characteristic can likewise comprise either forwarding the biometric characteristic internally within the mobile device, for example to a specific application or forwarding, via suitable transfer means, the biometric characteristic to a remote identification means like a login server of a bank, social network or the like.

The "user" is not necessarily the actual operator of the mobile device. The user, i.e. the person to be identified, can also be someone else. For example, the bottom of a foot can be a bottom of a foot of a baby to be identified. The "user" to be identified thus is the baby. The operator of the mobile device might be someone else, such as the parents of the baby or a nurse.

The step of obtaining the image is preferably performed via a freely taken image or application that allows for freely taking an image of a hand or a face or an eye. This means that no mask is provided by such application that indicates to the user the way the user has to arrange the user's hand or face or eye in order to take the image for identification.

This method allows for easily and reliably identifying a user while the user is freed from any constraints of how to behave or interact with the mobile device for identification.

In one embodiment, the object is a palm of a hand of the user and the biometric characteristic is at least one palmar crease, and processing the input comprises extracting, from the palmar crease, a biometric feature associated with the palmar crease, such as for example the length or direction of the palmar crease, to obtain an extracted biometric feature, and comparing the extracted biometric feature to a stored biometric feature stored in a storage to identify a difference between the extracted biometric feature and the stored biometric feature. If the difference between the extracted biometric feature and the stored biometric feature is below a threshold, then the user is identified by the palmar crease and, if the difference between the extracted biometric feature and the stored biometric feature is above the threshold, then the user is not identified by the palmar crease.

In one embodiment, the object is a face of the user and the biometric characteristic is at least one of a mouth or a nose of the user within the face, and processing the input comprises extracting, from the biometric characteristic, a biometric feature from the mouth or the nose to obtain an extracted biometric feature, such as for example the location of the mouth within the face, and comparing the extracted biometric feature to a stored biometric feature stored in a storage device to identify a difference between the extracted biometric feature and the stored biometric feature. If the difference between the extracted biometric feature and the stored biometric feature is below a threshold, then the user is identified by the biometric characteristic and, if the difference between the extracted biometric feature and the stored biometric feature is above the threshold, then the user is not identified by the biometric characteristic.

In one embodiment, the object is an eye of the user and the biometric characteristic is an iris of the eye of the user, and processing the input comprises extracting, from the iris, a biometric feature to obtain an extracted biometric feature, such as for example a pigment pattern of the iris, and comparing the extracted biometric feature to a stored biometric feature stored in a storage device to identify a difference between the extracted biometric feature and the stored biometric feature. If the difference between the extracted biometric feature and the stored biometric feature is below a threshold, then the user is identified by the iris and, if the difference between the extracted biometric feature and the stored biometric feature is above the threshold, then the user is not identified by the iris.

In one embodiment, the object is a bottom of a foot of the user and the biometric characteristic is a footprint of the foot, and processing the input comprises extracting, from the footprint, a biometric feature to obtain an extracted biometric feature, such as for example a length or direction of a line of the footprint, and comparing the extracted biometric feature to a stored biometric feature stored in a storage device to identify a difference between the extracted biometric feature and the stored biometric feature. If the difference between the extracted biometric feature and the stored biometric feature is below a threshold, then the user is identified by the footprint and, if the difference between the extracted biometric feature and the stored biometric feature is above the threshold, then the user is not identified by the footprint.

The biometric feature can thus be any feature of the palm, the face or the eye of the user or the bottom of the foot of the user that allows for a biometric identification of a user or can, at least, aid in identifying the user with the biometric characteristic and potentially other characteristics.

The threshold can be a numeric value that indicates whether and how much the biometric feature taken or obtained using the image corresponds to the biometric feature stored. For example, the threshold can be a real number x, where $0 \leq x = 1$. Here, a large x means that the obtained biometric feature and the stored biometric feature are allowed to differ more from each other while still allowing for an identification of the user. The smaller x is, the better the obtained biometric feature must correspond to the stored biometric feature in order to obtain an identification.

By setting the threshold to a value as necessary, the security of identification can be increased.

In one embodiment, the image comprises more than one object and the method further comprises identifying the position of each of the biometric characteristics in the image and using the biometric feature of each of the biometric characteristics for identification of the user.

By using, for example, all palmar creases for identification, the method for identifying the user is less prone to failure, as counterfeiting more than one palmar crease can require significant resources and thus is less likely to be encountered.

In one implementation of this embodiment, the user is identified by the biometric features of the objects by determining that a combined identification accuracy of the biometric features of all objects in the image is above a given threshold, or the user is identified by the biometric features of the objects by determining whether, for each of the objects, a difference between an extracted or obtained biometric feature of the extracted or obtained biometric characteristic of the object and a stored biometric feature of the biometric characteristic of the object is below a threshold, and determining that the user is identified by the obtained biometric characteristics of the objects if that the difference for each of the objects is below the corresponding threshold.

The combined identification accuracy should be understood as a combination of the identification accuracies of each obtained biometric feature taken in isolation. This means, for example, that the obtained biometric feature of each palmar crease, and/or each iris, and/or each footprint on the bottom of the foot of the user, etc., is evaluated in isolation from the other. In the above embodiment, an obtained biometric feature will be considered to correspond to a stored biometric feature, if the difference is below a given threshold. A relative value of correspondence between the extracted biometric feature and the stored biometric feature can represent an identification accuracy. For example, if the extracted biometric characteristic and the stored biometric characteristic of a fingertip match for 99.9%, the identification accuracy can have a value of 0.999. The sum of all identification accuracies can then be taken and, if this is above a threshold that can, for example, depend on the threshold that indicates whether a single extracted biometric feature is considered to correspond to a stored biometric feature, the user is considered to be identified by the extracted biometric features.

In one embodiment, the image is obtained by a camera as optical sensor of the mobile device. This makes the method applicable to current generation mobile devices like smartphones, since almost every currently available smartphone has at least one camera.

In one embodiment, processing the image as input by the neural network comprises processing, by a first layer of the neural network, the input to create a first intermediate output and processing, by each following layer, the output of the preceding layer, wherein the neural network comprises a plurality of layers, each layer being a depthwise separable convolution comprising, in processing order of the input within the layer, a depthwise convolutional layer, a first batch normalizer, a first rectified linear unit, a pointwise convolutional layer, a second batch normalizer and a second rectified linear unit. By processing the input using the plurality of layers, the neural network obtains, as an output, an identification of the object and the location of the object within the image.

The depthwise convolutional layer can use a multiplication or inner product of a feature map (matrix) corresponding to the original image with a kernel being a matrix in the size of, e.g., 3×3 to calculate a further matrix. Using such layers is more efficient with respect to the identification efficiency. This is because max-pool layers can result in information loss, which can in turn require more iterations. In view of this, the depthwise convolutional layers as proposed in the above embodiment are more efficient with respect to their parameter sensitivity than commonly used convolutional layers.

The depthwise convolutional layer and the pointwise convolutional layer may also be referred to as depthwise convolutional sub-layer and pointwise convolutional sub-layer. In fact, they are "layers within a layer" of the neural network, thus constituting sub-layers.

By applying this specific realization of the depthwise convolutional layer, together with the pointwise convolutional layer, the batch normalizer and the rectified linear units as provided in the above embodiment, the computer resources that are required by the neural network for performing real-time identification of objects carrying biometric characteristics like palmar creases or the iris in images can be significantly reduced compared to the presently known neural network technology. For example, certain types of YOLO technology can rely on max-pool layers as one of the group of layers within the used neural network.

In one embodiment, processing the image (e.g., creating the output) comprises separating the image, during the processing, into a grid comprising Q×R grid cells, wherein at least one bounding box is created within each grid cell, each bounding box having a predetermined position within the grid cell and predetermined geometrical characteristics, and modifying the predetermined position and the predetermined geometrical characteristics of the bounding box to obtain a resulting bounding box, wherein the resulting bounding box has a resulting position and resulting geometrical characteristics that most closely match the position of the object, thereby identifying the position of the object.

Separating the obtained image into grid cells with predefined bounding boxes allows for properly displaying and providing feedback on objects identified by using the bounding boxes in the final result to mark the location of the object and the object itself.

In a more specific realization of this embodiment, the predetermined position of the bounding box is calculated relative to a center of the grid cell in two dimensions and the geometrical characteristics of the bounding box comprise a height and a width of the bounding box, wherein the bounding box is associated with a probability of the object being within the bounding box.

Associating the bounding boxes with corresponding probabilities allows for the providing of a matrix or vector that represents the bounding box and can be handled by graphical processing units with accurate efficiency when having to combine this with other objects that are represented in the form of a matrix or vector. Thereby, the required computer resources are reduced even further.

More specifically, the output may be a tensor T of dimension Q×R×B×A, where A is the number of different bounding boxes in each grid cell and B is a vector associated with each bounding box having the dimension 5 and being represented as $$B = \begin{pmatrix} x - \text{position of bounding box} \\ y - \text{position of bounding box} \\ \text{width of bounding box} \\ \text{height of bounding box} \\ \text{probability} \end{pmatrix}$$

The resulting tensor can be processed by graphic processing units in a highly efficient manner. Additionally, providing the identification result in the form of such a tensor allows for the results having the greatest probability for identifying a specific object to be easily deduced.

Moreover, outputting the output may comprise displaying the image and the resulting bounding boxes in each grid cell that have the highest probability among the bounding boxes in the grid cell.

By providing only the grid cells having the highest probability, the user is provided with an identification of the position and the object through the bounding box including the respectively identified object that provides an easily recognizable feedback. Furthermore, the resulting bounding box represents only one vector within the result tensor provided as output in the previous embodiment and can thus be easily extracted by a user or other program and used for further processing by taking only respective coordinates of the resulting bounding box.

Although this way of identifying the position of the object (e.g., palm or the eye or the bottom of a foot) within the image might be preferred as it turns out to be less resource consuming than other methods, other methods may be contemplated. For example, a proposal could initially be made for an area where an object, like a palm, might be present. Those proposals could then be processed further in order to find out whether there indeed is an object, like the palm, present in the proposal for the area or not.

In a further embodiment, processing the image by the neural network comprises creating, from the image, at least one matrix I that represents a color value for each pixel in the image and providing the matrix as input to the neural network, wherein the image comprises N×M pixels and the matrix I is a matrix comprising N×M values, wherein the entries of the matrix I are given by $I_{ij}$, where i and j are integers and i=1 . . . N and j=1 . . . M.

Such separation of the image into a matrix for each of the color values allows for processing the color values separately, thereby advantageously increasing the identification efficiency while reducing the computer resources required.

More specifically, each depthwise convolutional layer applies a predefined kernel K to the matrix I, the kernel K being a matrix of size S×T where S, T<N; S, T<M comprising entries $S_{ab}$, wherein applying the kernel to the matrix comprises calculating the inner product of the matrix K with each reduced matrix R of size $(N \times M)_{S,T}$ of a matrix Z, where the matrix R has the same size as the kernel K, and the matrix Z has size $((N+2P_w) \times (M+2P_h))$ and the entries of the matrix $Z_{cd}$ with c, d∈ℕ⁺ are given by $$Z_{cd} = \begin{cases} 0 \,\forall\, c \leq P_w \\ 0 \,\forall\, c > P_w + N \\ 0 \,\forall\, d \leq P_h \\ 0 \,\forall\, d > P_h + M \\ I_{i,j} \text{ where } c = i + P_w; d = j + P_h; i = 1 \ldots N; j = 1 \ldots M \end{cases}$$

and provide a matrix P as output, wherein the matrix P has the size $$\left(\frac{N - S + 2P_w}{W_w} + 1\right) \times \left(\frac{M - T + 2P_h}{W_h} + 1\right),$$

where $W_w$ and $W_h$ define the stride width and each entry $P_{ij}$ of the matrix P is the value of the inner product of the ij-th reduced matrix R with the kernel K, wherein the matrix P is provided as output by the depthwise convolutional layer to the first batch normalizer.

The kernel allows for properly weighing information obtained from adjacent pixels in the feature map while not losing any information, thereby increasing the efficiency with which consecutive layers in the neural network can support the identification of the object. For this, the kernel comprises entries that correspond to specific weights or parameters that are obtained prior to receiving the image, i.e. during training of the neural network.

It is a finding that, in the case that this training is performed before the mobile device is actually equipped with an application or other program that can perform the respective method according to the above embodiments, the required computer resources can be advantageously reduced on the mobile device.

While it is a finding that it can be advantageous to implement the separable convolution using a depthwise convolutional layer and a pointwise convolutional layer because this combination shows improved performance with respect to the identification and the required computer resources, it can still be contemplated that the depthwise convolutional layer can be replaced with a convolutional layer specifically adapted to the identification of objects such as, palms or eyes or faces or the bottom of a foot. Therefore, even though the embodiments described herein are focused on the use of depthwise convolutional layers, it is also possible to implement a convolutional layer.

In a further embodiment, the batch normalizer calculates a mean value V from the matrix P by calculating $$V = \frac{\sum_{ij} P_{ij}}{n \cdot m}$$

and creates a batch normalized reduced matrix P' with entries $P'_{ij} = P_{ij} - V$.

By applying this normalization, unintended effects like over-exposition can be filtered out throughout the processing of the image through the respective layers, thereby allowing for an increased efficiency of identifying the object in the image.

Moreover, the size S and T of the kernel may be equal for all convolutional layers or is different for at least one convolutional layer.

By choosing an identical kernel for each of the convolutional layers (i.e. for each of the depthwise convolutional layers), the resulting program that is installed on the corresponding mobile device can be reduced in size. On the other hand, if a kernel is used that differs for at least one of the convolutional layers, known issues with respect to identification failures can be avoided if the kernel is properly adapted. For example, using a bigger kernel (corresponding to a bigger size S and T) at the beginning of the identification procedure can allow for taking and focusing more important portions of an image, thereby increasing the identification efficiency.

In one embodiment, the size S,T=3 and is the same for all depthwise convolutional layers and wherein at least one of the entries $S_{a'b'} \neq S_{a \neq a', b \neq b'}$.

It is a finding that a corresponding kernel represents the best trade of between the size of the kernel, the identification efficiency and the computer resources required for implementing the respective method, thereby increasing the overall efficiency with respect to the identification accuracy and the computer resources required.

In a further embodiment, the batch normalizer provides the normalized reduced matrix P' to the rectified linear unit and the rectified linear unit applies a rectification function to each entry $P'_{ij}$ wherein the rectification function calculates a new matrix $\overline{P}$ with entries $$\overline{P}_{ij} = \begin{cases} 0 \, \forall \, P'_{ij} < 0 \\ P'_{ij} \, \forall \, P'_{ij} \geq 0 \end{cases}$$

and the matrix $\overline{P}$ is provided as output to the pointwise convolutional layer if the rectified linear unit is the first rectified linear unit or to the next layer of the neural network if the rectified linear unit is the second rectified linear unit.

This rectification function allows for filtering out, after each layer in the neural network, portions in the image that are potentially negatively influencing the identification accuracy. Thereby, the number of false identifications and correspondingly the number of iterations that are necessary in order to arrive at a proper identification accuracy can be reduced, thereby saving computer resources.

It may also be provided that the pointwise convolutional layer applies a weight α to the matrix I, P, P' or $\overline{P}$ received from the preceding layer by multiplying each entry in the matrix P, P' or $\overline{P}$ with the weight α.

Even though the same weight α is applied to each of the points in the feature map, this embodiment allows for efficiently damping out portions in the image (corresponding to entries in the matrix that will not significantly influence the identification). This damping out is achieved by reducing the absolute contribution of such portions in the matrix and, together with the rectified linear unit, sorting those portions out in the next cycle.

In a preferred embodiment, each step of the methods explained above is performed on the mobile device.

This may at least comprise the steps of the above described methods that involve processing of the image and identification of the user. The storing of the image or biometric features or biometric characteristics can still be performed by any storage device being it internal or external to the mobile device. Further, it is still contemplated that the identification step of identifying the user is performed on a device different from the mobile device, like for example a server of a company.

By exclusively performing the respective steps on the mobile device, it is no longer necessary to keep a channel for data transmission, for example, to a server open on which the actually identification process runs. Thereby, the object identification can also be used in areas where access to the mobile network or a local area network is not available.

The mobile device comprises an optical sensor, a processor and a storage unit storing executable instructions that, when executed by the processor of the mobile device, cause the processor to execute the method of any of the above described embodiments.

DETAILED DESCRIPTION

Figure 1:
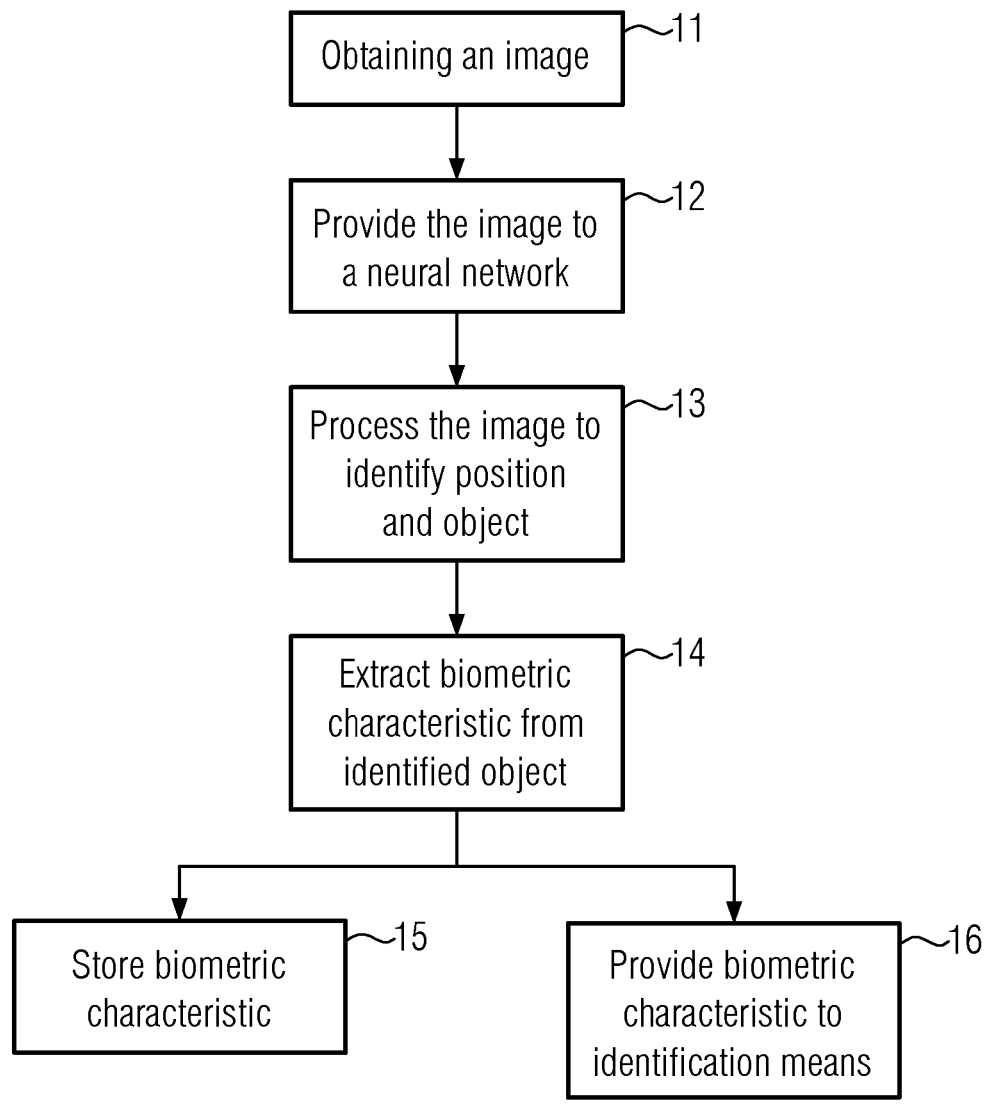
FIG. 1 shows a general overview of the method for identifying a user according to the invention, according to some embodiments of the present invention.

FIG. 1 shows a general overview of the method according to the invention for identifying a user using an image of an object of the user. The method begins in step 11 where an image of such an object is obtained. This object of the user will have a biometric characteristic that allows for identifying the user with this biometric characteristic. Specifically, the object may be one of the palm of at least one hand of the user, at least one eye of the user, the face of the user, the bottom of at least one foot of the user. The biometric characteristic obtained from this image may thus be, for example, one or more palmar creases of the palm of the user or the iris of the eye of the user or the (position of) the eyes, mouth or nose of the user or a combination of the latter, a footprint or a plurality of the bottom of the foot of the user.

The invention does not encompass embodiments where the object is a finger or a plurality of fingers or a fingertip or a plurality of fingertips and thus does also not encompass embodiments where the biometric characteristic is the fingerprint of the respective fingertip(s) or finger(s).

The image may be obtained by using an optical sensor like a camera. Most preferably, this optical sensor is an optical sensor of a mobile device like a smartphone commonly available. The camera may be a camera that is able to obtain high definition images with one megapixel or more.

The obtained image is then provided for processing in step 12 to a neural network that will be explained in the following in more detail. Providing the image to the neural network can comprise forwarding or transferring the image either internally within the mobile device to a corresponding application that realizes the neural network or providing the image to a remote location. This can be a server or other computing entity. However, it is preferred that the image is provided to the neural network that resides in the mobile device.

In step 13, the image is then processed by the neural network as will be explained in more detail below with respect to FIGS. 3 to 6. In any case, the processing of the image by the neural network will result in identifying both, the position of the object having the biometric characteristic and the object itself in the image. This means that, for example in the case that the object is a palm of a hand, the neural network will identify the palm within the image (i.e. will determine that the palm is present within the image) and will identify its position within the image. Identifying the position of the palm within the image may, for example, comprise identifying all pixels that belong to the palm or at least identify a subsection within the image that is not identical to the whole image, thus for example, a section corresponding to a tenth of the overall area of the image.

In the next step 14, the biometric characteristic is extracted from the identified object. Such extraction may comprise, for example, only extracting those portions of the identified palm that in fact constitute the palmar creases or at least one palmar crease. For the other objects encompassed by the invention, corresponding biometric characteristics will be extracted.

This biometric characteristic can then be processed further. This is shown with the steps 15 and 16.

In step 15, the biometric characteristic is merely stored. Storing the biometric characteristic can comprise storing the biometric characteristic on a preferably non-volatile storage device. This storage device may be a storage device like a solid-state storage in the mobile device itself or a remote storage location. The remote storage location may be server of a company or any other remote storage location. In this case, the biometric characteristic is forwarded in the form of a data packet (like an image or PDF or numerical values or the like) via data transfer means like a LAN connection or a WLAN connection or via the mobile internet.

In addition to storing the biometric characteristic in any way or alternatively to storing the biometric characteristic according to step 15, the biometric characteristic can be forwarded according to step 16 to an identification means as input. This identification means can be an application that resides in the mobile device with which the image of the object of the user having the biometric characteristic was taken or it can also be a remote identification means like a log in server or other entity that uses the biometric characteristic to identify the user and performs further steps like logging in into a social network, bank account or the like.

Figure 2:
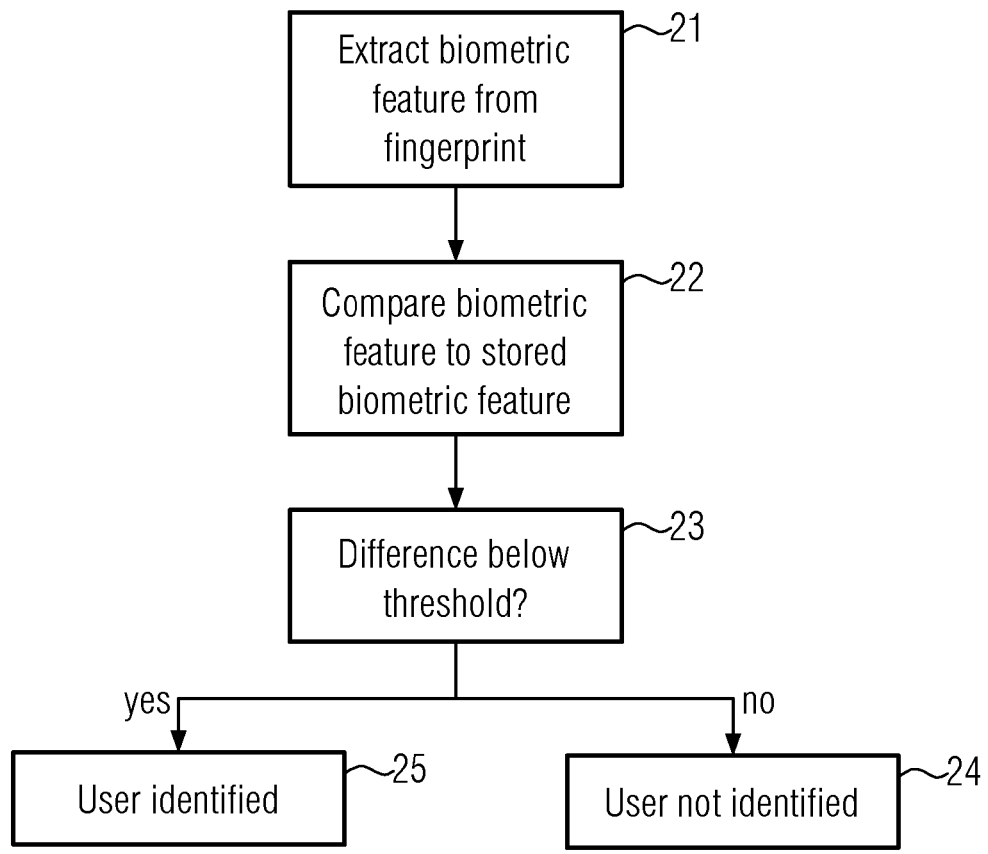
FIG. 2 shows a more specific flow diagram of performing the identification using a biometric feature extracted from the image, according to some embodiments of the present invention.

FIG. 2 shows a more detailed explanation of how a user may be identified using the biometric characteristic in the case the biometric characteristic being a palmar crease where the object would then be at least one palm of one hand of the user.

The method in FIG. 2 begins with the step 21 where the biometric feature is extracted from the palm and, consequently, these steps are at least performed after the step of extracting, from the identified object, the biometric characteristic in step 14 explained in FIG. 1.

Extracting the biometric features from the palm may, for example, comprise extracting location and/or length and/or direction and/or curvature of at least one palmar crease or a portion of a palmar crease or even a plurality of palmar creases. It can also comprise extracting only very specific kinds of palmar creases (for example those palmar creases that cross each other). It is noted that in the case that the objects are others as mentioned above, corresponding biometric features may be extracted.

For example, in the case that the object is at least one eye of the user, a pattern of the iris may be extracted as biometric feature. This pattern can not only comprise geometrical patterns within the iris but can also encompass color characteristics of the iris or the like.

In the case that the object is the face of the user, the biometric feature extracted may refer to the position of specific portions of the face or their distance relative to each other. For example, the position of the mouth, nose or eyes within the face may be extracted. Likewise, it is possible to extract the distance between mouth, nose and/or eyes as biometric feature.

In the case that the object is a bottom of a foot of the user, the biometric characteristic may be a footprint of the bottom of the foot. The extracting of the biometric feature may comprise extracting one or more of a location, length, direction, curvature of one or a plurality of lines in the footprint.

In order to identify the user using this information, it is of course necessary that a reference is available in the form of a corresponding biometric feature. For this reason, it may be the case that the identification means as explained previously with respect to FIG. 1 is associated with a storage device or comprises a storage device in which biometric features are stored for specific users. For example, for each user, a file may exist in which one or more biometric features are stored in the form of, for example, images, numerical values or other data structure. This may comprise that the palmar creases of at least one or even both hands of the user are stored and/or at least one pattern of the iris is stored and/or the position of at least one portion of the face as mentioned above or the distance of at least two portions of the face as mentioned above is stored and/or that at least one footprint of the bottom of at least one foot of the user is stored.

In the next step 22, the biometric feature obtained from the palm (or the respective other biometric features of the respective objects as mentioned above) is compared to a correspondingly stored biometric feature. This can comprise, in the case of the stored biometric feature being represented by a number of locations of the palmar creases, comparing corresponding locations in the extracted biometric feature. Of course, other means for comparing an obtained biometric feature to a stored biometric feature are known and can be used, for example, image recognition technologies, frequency transformations or the like. Comparing the obtained biometric feature and the stored biometric feature is done in such a manner that a degree of correspondence between the obtained biometric feature and the stored biometric feature can be calculated. In other words, this comparison will result in a difference between the stored biometric feature and the obtained biometric feature being calculated. This difference can be a single real number or a tensor or a vector or any other mathematical structure. It can also be a difference image that is obtained by subtracting, from a stored biometric feature image, an obtained biometric feature image on a pixel per pixel basis.

A threshold can be provided that can be used for determining whether the obtained biometric feature corresponds to the stored biometric feature and thus, allows for identifying the user.

Correspondingly, in step 23, it is determined whether the difference between the obtained biometric feature and the stored biometric feature is below or above this threshold. If it is below this threshold, it is determined in step 25 that the user is identified by the biometric feature. If the difference is above the threshold, it is instead determined in step 24 that the user is not identified by the biometric feature.

This will then result in the identification means determining either that the user is identified by the obtained palmar crease or the user is not identified by the obtained palmar crease. Corresponding determinations can be provided in the same manner in the case that the biometric characteristic is one of the others mentioned above.

FIGS. 1 and 2 have described the way of identifying the user using the biometric characteristic obtained from the originally taken image in the case only one palm is used for identifying the user and this palm was present in the image.

It is, however, also contemplated that the identification means may not only evaluate a single palm (or only one eye or the bottom of only one foot) but may evaluate more than both palms or both eyes or both foots (bottoms of the same respectively) available on the image in order to identify the user. The manner in which a biometric feature obtained from a single palm or palmar crease of the plurality of palms is matched to a stored biometric feature by the identification means corresponds to the one described with respect to FIG. 2.

However, in the case that more than one palmar crease (or iris or footprint of the bottom of the foot) is evaluated, it may be that the user is either only identified in the case that a combined identification accuracy of the biometric features is above a given threshold or the user is only identified in the case that, for each palm or eye or bottom of the foot obtained, the comparison of the obtained biometric feature with the stored biometric feature as explained in step 22 and 23 of FIG. 2 leads to the result in step 25.

The last case is straightforward as the method explained with respect to FIG. 2 is performed on every palmar crease or iris in the image and only if the difference between the obtained biometric feature and the stored biometric feature for each obtained palmar crease or iris is below the given threshold, the user is identified. In any other case, the user may not be identified.

However, in the case of the user is identified in the case that a combined identification accuracy of the palmar creases or irises or bottoms of all palms or eyes or feet in the image is above a given threshold, it is not necessary that, for each palm or eye, the comparison of the biometric feature obtained and the stored biometric feature results in the difference being below the threshold in line with step 23 of FIG. 2.

For example, considering the identification accuracy of a biometric feature to be number ranging from 0 (no identification) to 1 (complete match between the obtained biometric feature and the stored biometric feature), the combined identification accuracy may have a value of less than 2 (corresponding to perfect identification accuracy for two palms or two eyes or two feet, respectively) in the case that the combined identification accuracy is determined by the sum of the isolated identification accuracies obtain for each biometric feature alone.

For example, the corresponding threshold for the combined identification accuracy may be 1.75. In this case, it will be sufficient to identify the user in the case that, for example, the identification accuracies for each palm or eye (all palmar creases or irises, respectively) is approximately 0.9 since the sum of those identification accuracies (i.e. the combined identification accuracy) is 1.8 and, hence, above the respective threshold. As another example, considering that one of the palms is identified with an identification accuracy of 0.95, it will be sufficient if the other palm is only identified with an accuracy of 0.8. Corresponding values hold in the case that the object is an eye.

It is also possible to refer the identification accuracy to each biometric feature identified. This means that such identification accuracy can be provided for each palmar crease (or footprint of the bottom of a foot respectively), for example. Assuming 10 palmar creases may be identified as maximum for each hand with values each ranging from 0 to 1 in the manner as indicated above. The maximum reachable identification accuracy of both palms together will then be 20. In such a case, it could be sufficient if the combined identification accuracy is 18.5. Such combined identification accuracy can also be used for biometric features extracted from the face of a user. For example, the position of the mouth and the nose and at least one eye within the image of the face of a user as well as the distance of the mouth to the nose could be used for identifying the user. In such case, each of these biometric features (position and distance, respectively) can be associated with an identification accuracy ranging from 0 to 1. The combined identification accuracy can then reach values up to 4. An identification accuracy of 3.8 could be sufficient, with corresponding consequences for the identification accuracy of each biometric feature.

It is noted that the identification accuracy can be seen as the relative degree of similarity or correspondence between the obtained biometric feature and the stored biometric feature. Thus, in the case that the obtained biometric feature corresponds to 90% to the stored biometric feature, the identification accuracy (i.e. how accurate the user might be identified with this biometric feature) will be 0.9.

It is clear that other values for the identification accuracy or even also other values for the threshold can be used. Furthermore, there are also other means how the combined identification accuracy can be determined. For example, the combined identification accuracy may be calculated by determining the mean value of the identification accuracies or by determining the product of the identification accuracies.

In the figures that follow, the processing of the originally obtained image for extracting the biometric characteristic in line with steps 12 to 14 will be described in more detail and, further, an explanation regarding how the neural network can be trained to be able to identify fingertips with high accuracy will be given.

Figure 3:
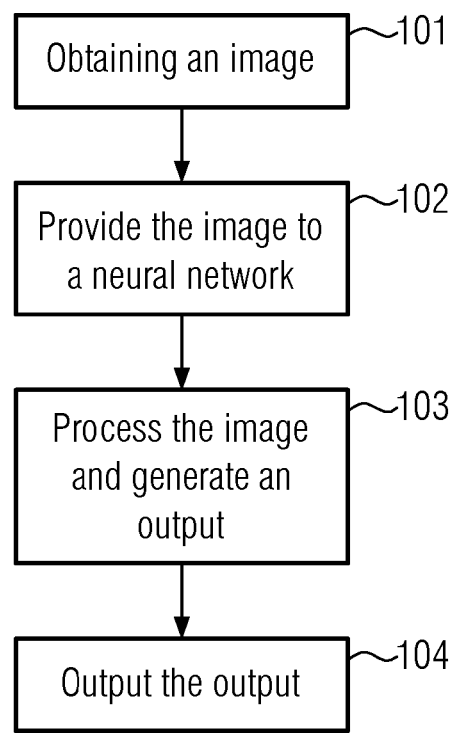
FIG. 3 shows a schema representing the general processing flow of identifying an object within an image, according to one embodiment of the present invention.

FIG. 3 depicts a flow schema of an implementation of the steps 12 to 14 of FIG. 1 according to one embodiment. The now explained method is intended to allow for identifying an object carrying a biometric characteristic of a user within the obtained image. The image is obtained in first step 101 (corresponding to step 11 in FIG. 1) preferably by an optical sensor of a mobile computing device. This mobile computing device may be a smartphone or a tablet computer or other corresponding device. The optical sensor will thus usually be a camera but could also be an infrared camera or other optical sensor. This camera can be a camera having a resolution of 1 megapixel (MP) or may be an HD-camera or may even have a lower resolution. The resolution can be arbitrary and can cover, for example, any resolution usually applied by commonly used optical sensors, like cameras. However, in some exemplary embodiments, the resolution of the obtained image is at least 104×104 with three color values per pixel, or it can be 224×224 with three color values per pixel.

The obtained image may include an object that is to be identified not only with respect to the object as such (for example a palm, eye or face or bottom of foot) but also with respect to its position within the image. The object is intended to carry or have a biometric characteristic of the user that allows for properly identifying the user. This means the object has to be an object like a palm (or any other object referred to above that) has a palmar crease or other suitable biometric characteristic as discussed above. It is known that palmar creases or, for example, the pattern of an iris can be used for identifying a user individually, i.e. besides some very special cases, the palmar creases are unique for each person and thus allow for differentiating between two persons based on the obtained palmar creases.

It is noted that in the following reference will only be made to the palm of a hand or two palms of the hands of the user, respectively. However, any other suitable object or biometric characteristic or biometric feature can be substituted with these in the manner as already discussed above. For example, at least one eye or both eyes of the user and/or the face of the user and/or the bottom of at least one foot of the user can be used as respective objects and the corresponding biometric features and biometric characteristics discussed above for these objects.

While reference will be made with respect to FIG. 1 and the following figures to "an image", the embodiments described herein allow for real-time object identification and, hence, the processing time required is in the area of a few milliseconds, thereby allowing for also properly identifying objects in consecutive images like in a video or live-stream obtained by the optical sensor. Therefore, the term "image" is to be understood to not only refer to a single image but also to images obtained in succession in very short time like a video stream.

In fact, as is common for smartphones, when activating the camera, the user of the smartphone is provided with the actual view of the camera without even taking a photograph. This "preliminary view" is thus also constituted of a plurality of images that are taken by the camera, usually with lower resolution. Even for those images, the described method can be used.

In a second step 102 of the method, the obtained image (or the images obtained in succession one after the other) is provided to the neural network in accordance with step 12 of FIG. 1, where the neural network preferably but not necessarily resides on the mobile device.

The neural network may be implemented in an application (app) or in any other program that is running on the mobile device. In a preferred embodiment of the invention, the further processing that is performed by the neural network and any other steps that are performed can be carried out without having to refer to any computing entity outside of the mobile device, thus also allowing for carrying out the method in an "offline" mode of the mobile device.

The step 102 may be realized by forwarding the image without any further processing of the image or without any further pre-processing of the image directly to the neural network. However, this step may also comprise a pre-processing of the image wherein, for example, the resolution of the originally obtained image is changed, specifically reduced. In the case of identifying palms within an image, it is, in some examples, sufficient to have a comparably low resolution of 104×104×3 (the "3" corresponds to three color values of the image, i.e. blue, red and green), though the embodiments described herein are not limited in this regard and other resolutions can be chosen. In the case that the obtained image has a resolution that is much larger than the 104×104 image resolution as necessary for identifying palms, step 102 or a step that is provided between the steps 102 and 103 can comprise reducing the resolution of the image. This pre-processing may also comprise other steps like changing the brightness conditions, changing the gamma value within the image or providing any other pre-processing that is considered adequate.

Corresponding resolutions have been found out to be sufficient for identifying faces and eyes in images.

After the image has been provided as input to the neural network in step 102, this input is processed in step 103 by the neural network in such a way that an output is created that allows for identifying the object and/or the location of the object within the image. In the case of the object being a palm, this means that at least one palm that is present in the image is identified (for example in the form of a label) and its location (for example the coordinates of the pixels constituting the palm) are also somehow provided in the output. As will be explained later, this can be achieved by providing a bounding box that surrounds and includes the identified palm at a location that corresponds to the palm and where the bounding box is superimposed over the palm. The coordinates of this bounding box relative to the image can then be used as the position of the palm.

Processing the input (i.e. essentially the image received) in step 103 can be facilitated in a plurality of ways by using the neural network. In any case, it is intended that the neural network is a trained neural network that is specifically trained for identifying the intended objects carrying a biometric characteristic. More preferably, the neural network is trained for identifying, within an input image, palm(s) irrespective of their location and arrangement with respect to the optical sensor as long as the optical sensor can take an image of at least one palm. The processing may involve, as will be explained later, the processing of the input through a plurality of layers of the neural network.

For example, the input can be processed by a first layer of the neural network to create a first intermediate output that is then processed by the layer following the first layer in the processing direction of the neural network to create a second intermediate output. This second intermediate output is then forwarded to the next layer in the neural network where it is processed to create a third intermediate output and so forth until all layers in the neural network have processed their correspondingly received intermediate output. The last layer in the neural network will provide a "final" output that can later on be output in step 104 as will be explained below.

Further, each layer of the neural network can be constituted of two convolutional layers such that each layer of the neural network represents a depthwise separable convolutional filter, also called a depthwise separable convolution. This depthwise separable convolution (i.e. the layer of the neural network) comprises, in the processing order of the input through the depthwise separable convolution, a depthwise convolutional layer, a first batch normalizer and a first rectified linear unit. In processing order after the first rectified linear unit, a pointwise convolutional layer, a second batch normalizer and a second rectified linear unit are provided, where the second rectified linear unit or a processing module that receives the output from the rectified linear unit will forward the intermediate output to the next layer in the neural network.

After processing the image through all the layers of the neural network, an output is created that will finally identify the position and the object itself.

This is done according to step 104, where the output of the neural network is output. According to preferred embodiments of the invention, this output may be a "modified image" where this image may be augmented with a bounding box that surrounds the identified palm in order to give the user feedback on the identified object and its position.

However, the output does not need to be displayed on a display of the mobile device or any other display associated with the mobile device. In fact, the output can also be provided in the form of a matrix or a tensor as will be explained below that correctly identifies the position of the palm in the image (specifically the coordinates of the pixels within the image that constitute the palm) and this matrix or tensor can be forwarded to a further processing module that uses this information, specifically the coordinates identifying the palm, to apply further processing to the identified palm. The output can later on be used for extracting the biometric characteristic from the identified object, in line with step 14 according to FIG. 1.

This further processing can preferably include that the identified palm is evaluated in order to identify the at least one palmar crease of the user. For example, considering a high resolution image taken from the palm, the method can comprise that, in a first step, the position of the palm in the image is identified using the method comprising the steps 101-104 as explained above and the final output is then forwarded to a further image processing component that uses the output that identifies the palm and its location to evaluate the high resolution image in order to identify the palmar crease. This can be used to identify the user, thereby for example increasing the security of further processes as was explained with reference to FIG. 2. For example, if the user uses the method in order to identify himself for a bank transfer with his mobile device, the method can increase the security of the bank transfer by allowing for a correct and unique identification of the respective user as the palmar crease of a user uniquely identifies this person.

The embodiments described herein are not limited to performing bank transfers using a corresponding method for identifying a palm, but can also be used to identify the user in order to, for example, access functions of the mobile device or any other activity that requires identification and authentication of the user.

Figure 4:
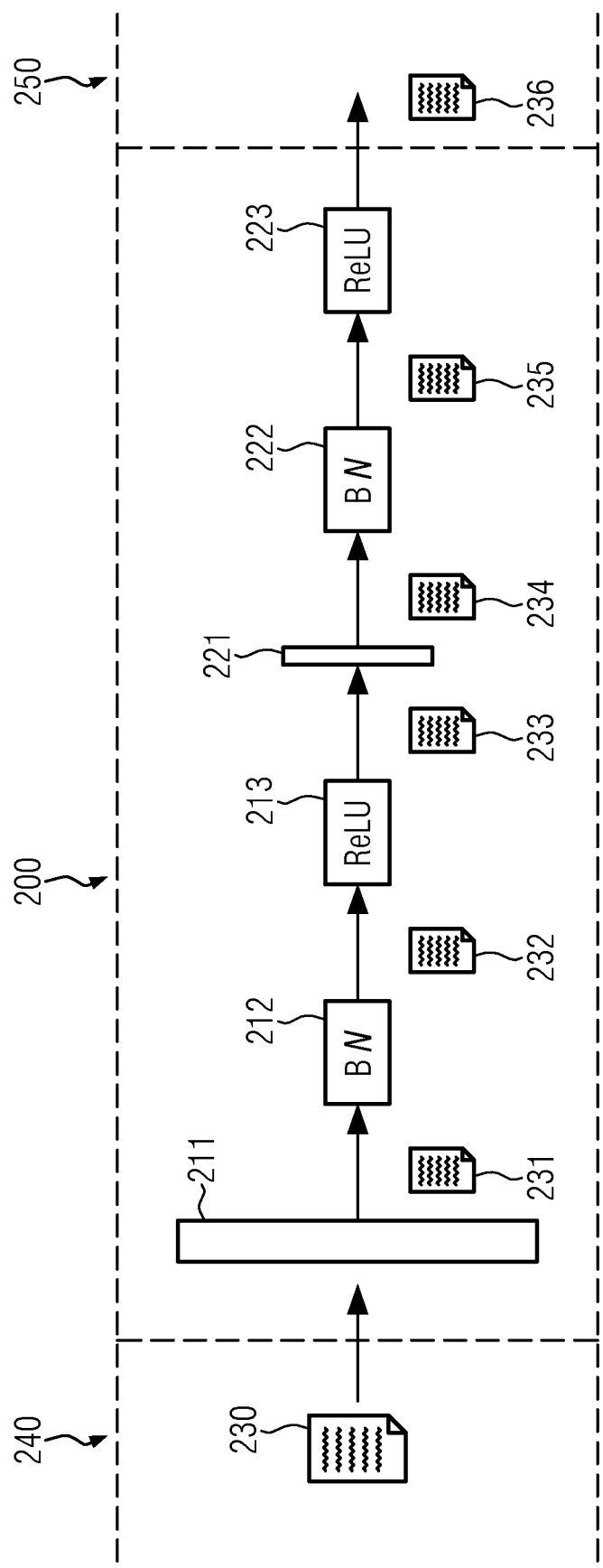
FIG. 4 schematically shows the structure of one layer within the neural network and the processing of data within this layer, according to some embodiments of the present invention.

FIG. 4 shows the internal processing of a received input in one layer 200 of the neural network according to one embodiment of the invention. This layer 200 may be a layer that is, in processing order of the original input through the neural network, the first layer that receives the original input after step 102 explained above or any intermediate layer that is arranged between two further layers 240 and 250 of the neural network or the layer 200 may even be the last layer of the neural network that will, in the end, provide an output according to step 104 as explained with reference to FIG. 1.

In any case, the layer 200 will receive an input 230 that at least somehow corresponds to the originally obtained image. This input is preferably provided in the form of at least one matrix that has the dimension N×M where N and M are integers greater than 0. The matrix may, for example, represent the pixels in the image for at least one color value (for example red). The entries in this matrix thus may have values that correspond to the value of the respective color (in the example case red) of this specific pixel. As will be clear from the following, the input may not be identical to the obtained image but can be a matrix P that was obtained from the matrix representing the original image by some processing through layers in the neural network or even by some pre-processing (for example reduction in resolution as explained above).

For ease of discussion, however, the input 230 will be assumed to correspond to the N×M matrix that represents the originally obtained image and each entry in this N×M matrix corresponds to a value of a color (for example red) of a pixel in the respective image. Applying this teaching to any other transformed matrix that originates from the original N×M matrix and is obtained through processing this matrix in layers of the neural network is straightforward.

Following now the process exemplified in FIG. 4, the input 230 is received by the depthwise convolutional layer 211 for processing. In the following, a comparably simple example will be given with respect to how the input matrix 230 can be processed by the depthwise convolutional layer. This will involve that a kernel K is used to calculate inner products with the matrix. The kernel is run over the matrix in so called "strides". While the following example will use values for horizontal and vertical stride widths of 1, any other value greater than 1 can be used as long as the stride widths are integers greater than 0. The kernel K is of size S×T, where S and T are integers smaller than N and M.

Furthermore, it will be assumed that only the original input matrix I (i.e. the input matrix 230) of size N×M is used for calculating the inner product with the kernel. It is, however, also contemplated that an extended matrix Z can be used for calculating the inner products with the kernel. This extended matrix Z is obtained by "attaching", to the original matrix I, lines and rows above the first line and below the last line as well as left to the first row and right to the last row.

This is called "padding". The padding will usually comprise that a number $P_w$ of lines is added in the line direction and a number $P_h$ of rows is added to the row direction. The number $P_w$ can equal S−1 and the number $P_h$ can equal T−1, such that any inner product calculated between Z and the kernel contains at least one entry of the original matrix I. The resulting matrix Z will thus be of size $(N+2P_w) \times (M+2P_h)$. In view of this, the matrix Z will have the following entries:

$$Z_{cd} = \begin{cases} 0 \forall c \leq P_w \\ 0 \forall c > P_w + N \\ 0 \forall d \leq P_h \\ 0 \forall d > P_h + M \\ I_{ij} \text{ where } c = i + P_w; d = j + P_h; i = 1 \ldots N; j = 1 \ldots M \end{cases}$$

In this context, it follows that the new matrix obtained by calculating all inner products and arranging them properly according to lines and rows will generally be of size $$\left(\frac{N-S+2P_w}{W_w} + 1\right) \times \left(\frac{M-T+2P_h}{W_h} + 1\right),$$

where $W_w$ and $W_h$ define the stride width in the direction of lines and the direction of the rows, respectively. It is clear that only those paddings and those stride widths are allowed for a given kernel K with size S×T that result in integers for the size of the new matrix. Furthermore, the stride widths $W_w$ and $W_h$ are preferably smaller than S and T, respectively, as otherwise the kernel would be moved over the matrix I in a manner that some lines or rows of the original matrix are left out in calculating the new matrix.

For ease of discussion, it will be assumed in the following that no padding is provided to the original matrix I and the stride width is 1 for horizontal and vertical strides. Furthermore, it will be assumed that the kernel is a matrix with size S×S, i.e. the special case where S=T will be assumed. Applying the explanations given below to arbitrary padding and stride width as well as to any kernel size is straightforward with the teaching provided below.

In the depthwise convolutional layer 211, the received input matrix 230 is used to form an inner product with the kernel K that has the size S×S where S<N, M. The inner product is calculated for each reduced matrix of the original N×M matrix where the reduced matrix is of size S×S and contains coherent entries in the original N×M matrix. For example, considering S=3, the first reduced matrix R of the N×M original matrix comprises the entries i=1, 2, 3; j=1, 2, 3 such that the reduced matrix $(N \times M)_S$ is comprised of nine entries and the inner product with the kernel K is calculated which results in a single number. The next reduced matrix in the directions of the lines of the original N×M matrix is the matrix where i is increased by 1, such that the next matrix in this direction is constituted of the items in the original N×M matrix where i=2, 3, 4; j=1, 2, 3. This matrix may then be used for calculating the next inner product with the kernel. It is noted that the given example of the S×S matrix with S=3 is only one example and other kernels may also be used.

In order to calculate the next reduced matrix R of the size $(N \times M)_S$ in the direction of the rows/columns, the index j of items in the original N×M matrix is increased by 1. This is done until the last reduced matrix in the direction of the lines where i=N−S+1, N−S+2, N−S+3 in the case for S=3. For the rows, this is done in a corresponding manner where j=M−S+1, M−S+2, M−S+3. By calculating those inner products, a new matrix, the matrix P is calculated that has the size (N−S+1)×(M−S+1). Its entries $P_{ij}$ correspond to the respective inner product calculated with the corresponding reduced matrix of the original N×M matrix and the kernel K. It is noted that a matrix of this size will, in fact, be forwarded to the pointwise convolutional layer of the layer 200.

The kernel K constitutes entries that are obtained through a learning process where the neural network is trained in order to properly identify the intended objects. The kernel K used in the layer 200 of the neural network is not necessarily identical in size and entries to the kernels used in other layers of the respective neural network. Additionally, the entries in the kernel do not need to be identical to each other but at least constitute numbers being larger or equal to 0. The entries may be considered to represent "weights" that are obtained through learning of the neural network.

The result of the processing of the matrix 230 by the depthwise convolutional layer is the matrix 231 having, as explained above, size (N−S+1)×(M−S+1) in the case that the kernel is moved in strides over the original N×M matrix that have a distance of Δi=1 in the direction of the lines Δj=1 in the direction of the rows. In case, however, those strides have a larger distance like Δi=2 or Δi=3 (and potentially, correspondingly for the rows), the dimension of the result 231 will change correspondingly as explained above.

In the further processing, this result 231 is forwarded to the first batch normalize 212 that follows in the processing order depicted with the arrows in FIG. 4 after the depthwise convolutional layer 211. The batch normalizer attempts to normalize the received result matrix 231. This is achieved by calculating the sum over each of the entries in the (N−S+1)×(M−S+1) matrix and dividing it by the number of entries in the (N−S+1)×(M−S+1) matrix. The mean value V for the (N−S+1)×(M−S+1) matrix, denoted as P in the following with corresponding items $P_{ij}$, is given as $$V = \frac{\sum_{ij} P_{ij}}{n \cdot m}$$

where n and m represent the number of lines and columns/rows in the N×M matrix or the number of lines and columns in the matrix P. The items $P_{ij}$ are the entries of the matrix P where a given item $P_{ij}$ is the element in the matrix in line i and column j.

The batch normalizer then calculates a reduced matrix P' by subtracting, from each entry $P_{ij}$ in the original matrix, the mean value V such that $P'_{ij} = P_{ij} - V$. Thereby, the values in the reduced matrix P' are normalized such that anomalies in the one or the other direction (extremely large values or extremely low values) are filtered out.

The result 232 created by the first batch normalizer 212 is a matrix still having (in the example given in FIG. 4) the size (N−S+1)×(M−S+1) since, until now, no further dimensional reduction of the matrix was performed.

The result 232 is then provided to the first rectified linear unit 213 that follows the first batch normalizer 212.

The rectified linear unit modifies each entry in the matrix 232 further by calculating a new matrix entries $\overline{P}_{ij}$ where $$\overline{P}_{ij} = \begin{cases} 0 \forall\, P'_{ij} < 0 \\ P'_{ij} \forall\, P'_{ij} \geq 0 \end{cases}$$

This results in values that would be smaller than 0 after having passed the batch normalizer to be set to 0, thus having no further influence on the further processing in the depthwise convolutional layer that will be explained in the following. This means that, for example, color values that are below the mean value calculated in the batch normalizer are not considered further and only the values that at least correspond to the mean value V have influence on the outcome of the next step in the calculation.

The result 233 thus output by the first rectified linear unit 213 still is a matrix of shape/size (N−S+1)×(M−S+1) and this matrix is forwarded to the pointwise convolutional layer 221.

This pointwise convolutional layer 221 creates a result 234. This result 234 is created by the pointwise convolutional layer 221 by taking each entry in the (N−S+1)×(M−S+1) matrix 233 and multiplying this entry with a weight α. The weight α preferably is a number that is greater than 0 in any case and this number is identical for each entry in the (N−S+1)×(M−S+1) matrix. The result 234 that is obtained from the pointwise convolutional layer 221 thus is a matrix having the same size (N−S+1)×(M−S+1) but where each entry is multiplied with the weight α.

The result 234 is then provided to the second batch normalizer 222 where it is normalized in the manner as explained for the first batch normalizer 212 and a normalized matrix P' of the same dimension as the result 235 is calculated and this matrix/result 235 is forwarded to the second rectified linear unit 223 where a rectification function is applied to obtain a result/matrix $\overline{P}$ 236 that is then forwarded to the next layer in the neural network or, if no other layer follows in the neural network, the result 236 is provided as an output.

It is a finding that, for identifying a palm, thirteen layers that are identical to the layer 200 explained in FIG. 4 are most appropriate as they result in a comparably high identification accuracy of the palm and its location while only requiring reduced computer resources for implementation of the respective method which makes it more applicable to mobile devices.

Figure 5:
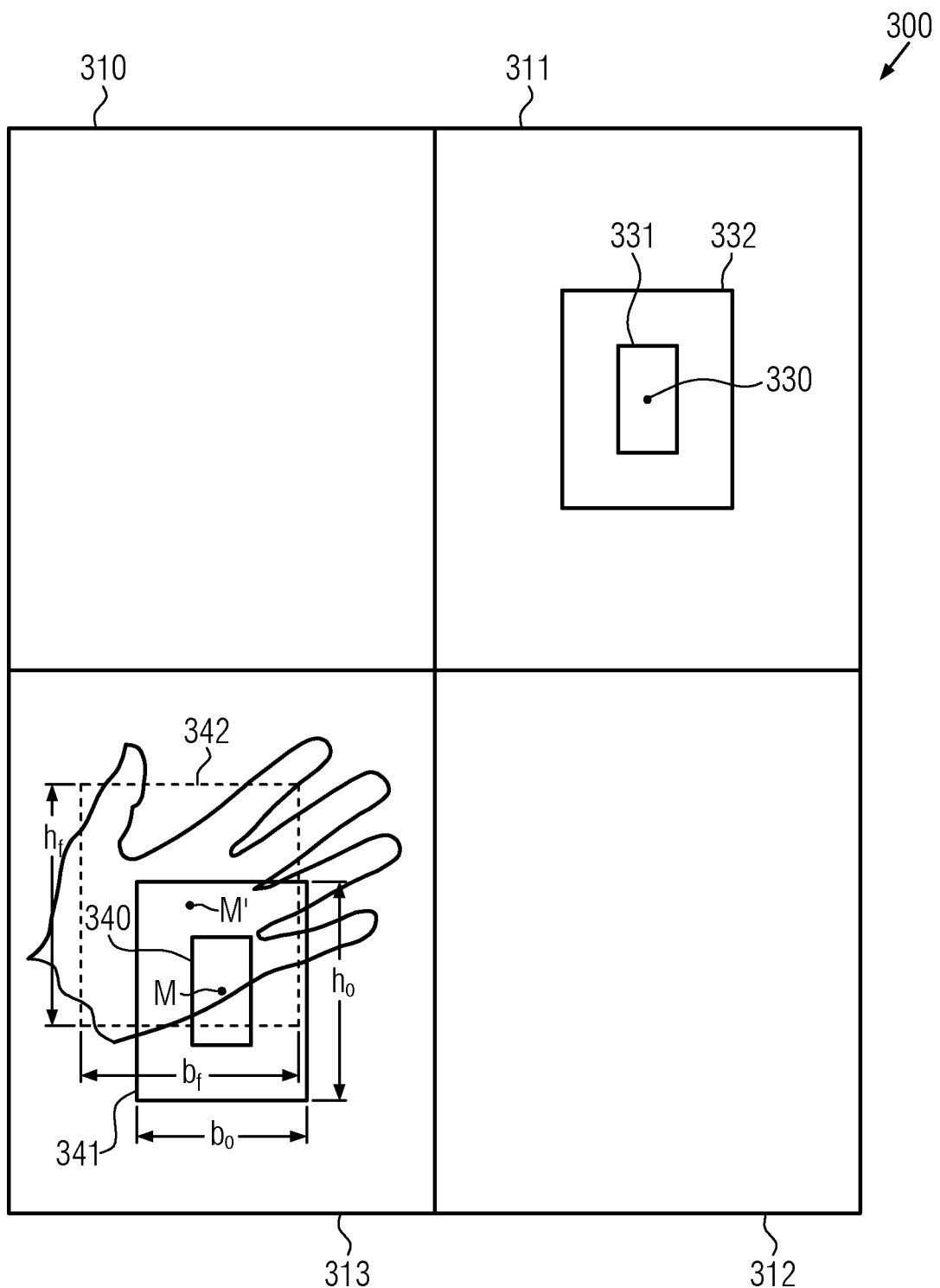
FIG. 5 is a schematic depiction of the processing of an image of a hand using bounding boxes, according to some embodiments of the present invention.

FIG. 5 shows a further embodiment that extends the concept described in FIG. 4 in order to allow for an identification of a palm (specifically the pixels in the original image constituting the palm) using a number of bounding boxes and a separation of the original image into grids. It is noted that the steps described in the following can be performed after having processed the original image in each layer of the neural network or only after the image has been processed in the final layer of the neural network, thus immediately before outputting the output according to step 104 of FIG. 3.

The embodiment described in FIG. 5 assumes an already learned neural network that is perfectly able to identify palms or other objects with high accuracy based on the output received from a layer of the neural network.

In accordance with the embodiment of FIG. 5, it will be assumed that the output received from the layer of the neural network can still be somehow represented in the form of an image 300 of a hand 350 that comprises a palm. Reference will thus only be made to "the image" although it is clear that instead of the image also one of the output matrices as explained in FIG. 2 can be used.

In a first step, the image 300 received is separated into a plurality of grid cells 310, 311, 312 and 313. While four grid cells are provided here, only two or even more grid cells can be provided. The number of grid cells in each direction is not limited, but in another preferred embodiment, the image 300 is separated into 2 grid cells in horizontal direction and 2 grid cells in vertical direction such that instead of a general Q×R grid a 2×2 grid is created. This embodiment is advantageous in case single objects, like the palm of a hand, a face or baby foot are to be found/identified in an image. If a plurality of objects is to be identified, values Q=R=7 may be used.

In a next step, the center point 330 of each grid cell is identified and used for establishing the origin of a coordinate system for each of the grid cells separate from any of the other grid cells. Around this center 330, at least one bounding box 331 and 332 which will usually have the shape of a rectangle is arranged where those have, as can be seen in the grid cell 313, an initial height $h_0$ and a width or breadth $b_0$. For a plurality of bounding boxes in each grid cell, those values can be different from each other. For example, initial values $h_0$ and $b_0$ can be taken for the smallest bounding box per grid cell and those values can be increased by a factor 1.5 or 2 or any other value in order to calculate the dimensions of the other bounding boxes in the respective grid cell.

It is noted that the position of a bounding box, for example the bounding box 331, in the coordinate system of the respective grid cell will be represented by the position of the center point of the bounding box 331 with respect to the center point 330, i.e. the origin of the respective coordinate system, in the respective grid cell. Thus, the position of the respective bounding box in the grid cell 311 can be represented by two coordinates x and y. The width and height of the bounding box are considered to represent geometrical characteristics of the bounding box which can be represented by two values larger than 0.

As those bonding boxes will later be used to identify the position of a palm, it is also appropriate to associate, with each of those bounding boxes, a fifth value which is the probability of the bounding box to include the respective palm that is to be identified.

Thus, each bounding box can be represented by a vector of dimension 5 in the form $$B = \begin{pmatrix} x - \text{position of bounding box} \\ y - \text{position of bounding box} \\ \text{width of bounding box} \\ \text{height of bounding box} \\ \text{probability} \end{pmatrix}$$

This means that the grid cells together with their respective bounding boxes can be represented in the form of a tensor T having the dimensions Q×R×B×A, where A is the number of bounding boxes per grid cell. Though the values of Q and R are not limited, in some embodiments, for example when identifying palms, a face or eyes or bottom of a foot, values like Q=R=2 or Q=R=7, b=5 (the dimension of vector B) can be chosen and A can be set to an integer between 3 and 10, most preferably 5.

As explained above, it is assumed that the neural network is already perfectly learned for identifying a specific object, preferably a palm, eye or face or bottom of a foot. This involves that the neural network is able to identify a specific pattern of pixels that are most likely representing a one of these objects. This might refer to specific patterns of color values or other characteristics like the brightness of those spots. It is, however, clear that the image 300 may arbitrarily show a palm (or other object) which might not correspond in size and arrangement to a palm or other objects that was used for learning the neural network.

With the help of the bounding boxes and the grid, however, it is possible for the neural network to identify the specific bounding box that will most likely comprise the respective object. In order to identify this specific bounding box, the neural network (or an associated component that processes the image 300) compares the values of the pixels within each bounding box of each grid cell to a pattern of pixels that corresponds to an object as was previously learned by the neural network. In this first stage, it is most unlikely that a perfect match will be found but there will be bounding boxes that are already more likely to contain at least a portion of an object than other bounding boxes.

In the case depicted in FIG. 5, for example, the bounding box 341 centered around the point M in grid cell 313 includes a portion of the palm of the hand 350. In contrast to this, none of the grid cells 310 and 311 as well as 312 comprise bounding boxes that include a portion of a palm. When the method continues to evaluate the pixel values within the bounding box 341 and potentially the bounding box 340, the process can determine that the bounding box 341 includes even more of a pattern that corresponds to a palm than the bounding box 340.

In view of this, the method can conclude that none of the bounding boxes 331 and 332 (and potentially other bounding boxes in other grid cells) includes a palm and can set their probability value in their corresponding B-vector to 0.

As both bounding boxes 340 and 341 as centered around the point M comprise at least a portion of a palm, they may be considered to be likely to in fact comprise a palm and the probability value will be greater than 0 in a first step.

While the smaller grid cell 340 is almost completely filled with a pattern that could correspond to a palm, only the left border of the greater bounding box 341 may be regarded by the process to include a pattern that corresponds to a palm.

With this, the method may continue to calculate a loss function that determines the difference between the pattern identified within each of the bounding boxes 341 and 340 to a pattern obtained from learning which indeed corresponds to a palm.

In the next step, the method will attempt to minimize this difference by modifying the size and the position of the respective bounding boxes. In this regard, it can be envisaged that the larger bounding box 341 is used as the starting point and its position and shapes modified or the smaller bounding box 340 is used as the starting point and its position and size are modified in order to minimize the differences to the learned pattern.

This minimizing process can firstly comprise modifying the position of the bounding box (in the following, it will be assumed that the bounding box 341 is used for the further calculations) by moving it a small amount into orthogonal directions first along the x-axis and then along the y-axis (or vice versa) as depicted in FIG. 3 around the center point M of the respective grid cell.

The movement will be along the positive and the negative x-axis and y-axis and at each position, a comparison will be made to determine a difference function between the pattern obtained from the learning and the actual pattern identified in the image. This allows for calculating a two-dimensional function that represents the difference d(x,y) depending on the coordinates.

Based on this, a gradient $\nabla_{xy}d$ can be calculated which allows for determining in which direction in the coordinate system, the bounding box has to be moved in order to increase and preferably maximize the match with the learned pattern (corresponding to minimizing the value of the function d(x,y)). This will be the case for $\nabla_{xy}d=0$.

This can result in the bounding box being moved along the direction r to a new center point M' where the function d(x,y) has a minimum. In a next step, the size of the respective bounding box at position M' can be increased and reduced in order to determine whether with increasing or reducing the size in one or two directions (i.e. the height and/or the width) changes the value of a further difference function compared to the original pattern which can be denoted with e(h,b) depending on the height h and width b. This function is minimized such that for a specific bounding box having a position M' and having a height $h_f$ and a width $b_f$, the difference to the learned pattern is minimized.

This bounding box will then be used as the final bounding box which has the greatest probability p of identifying those portions of the image 300 that contain the respective palm (or other object. The output vector for this bounding box will then have the form $$B = \begin{pmatrix} x \\ y \\ b_f \\ h_f \\ p \end{pmatrix}$$

As a result of this process, a tensor T with dimension Q×R×B×A is output where, for each bounding box in each grid cell, the x and y position with respect to the center of the grid cell as well as the width and the height of the respective bounding box and its probability to identify or comprise a palm is given.

In order to prevent the movement of bounding boxes of adjacent grid cell to be moved into the same direction such that they overlap each other and in order to prevent bounding boxes of different grid cells to move into other grid cells, the method can be provided such that the movement of the center of a bounding box is only possible within its original grid cell.

The result will thus be a tensor comprising a plurality of vectors B where one or more of those vectors have a high probability of identifying the palm whereas others have a low probability. Those with a low probability can be neglected completely by setting all their corresponding values to 0, thereby reducing the processing effort necessary in processing the tensor.

The vectors B with the highest probability will then be used in order to allow the further processing of the image and specifically those portions of the image that identify a palm for example in order to identify the user of the mobile device by processing the palm in order to identify the palmar crease(s).

While the above approach allows for properly identifying the bounding box that will be used to further process the identified biometric characteristic, like a palmar crease or an iris of an eye or a footprint of a bottom of a foot, a further explanation will be given regarding the bounding boxes that have to be discarded.

As explained above, the vector B of a bounding box comprises a probability p that indicates the likelihood that the respective bounding box includes or represents a palm. This can be used to sort all bounding boxes (or their vectors, respectively) in descending order beginning with those vectors B that have the highest probability value p.

Having done so, the list can be traversed in descending order beginning with the bounding box having the highest value p. This traversing can include selecting a specific bounding box with value p from the list and calculating, for this specific bounding box, the amount of intersection with all remaining bounding boxes. This means the area of the specific bounding box that is selected is compared to the area of the remaining bounding boxes and any areas they have in common (i.e. where the bounding boxes intersect) contributes to the calculated intersection.

The amount of intersection can be calculated as a ratio with respect to the area of the selected bounding box. Thereby, a dimensionless value is obtained for each calculated intersection that ranges from 0 (no intersection) to 1 (the considered remaining bounding box completely intersects or covers the area of the selected bounding box).

In a next step, a preset threshold can be used to neglect or discard bounding boxes or sort them out. In the above example, the threshold might be a calculated intersection of 0.75. For every calculated pair of a selected bounding box and a remaining bounding box for which the intersection exceeds this threshold, the bounding box having the lower value p can be neglected or sorted out from the list mentioned above.

This will finally result in only one bounding box remaining which will represent the palm of the hand. This can, of course, result in a number of remaining bounding boxes, depending on how many relevant objects or biometric characteristics are visible in the image. If, for example, there are two hands with corresponding palms or two eyes on the image, two bounding boxes will remain.

Figure 6:
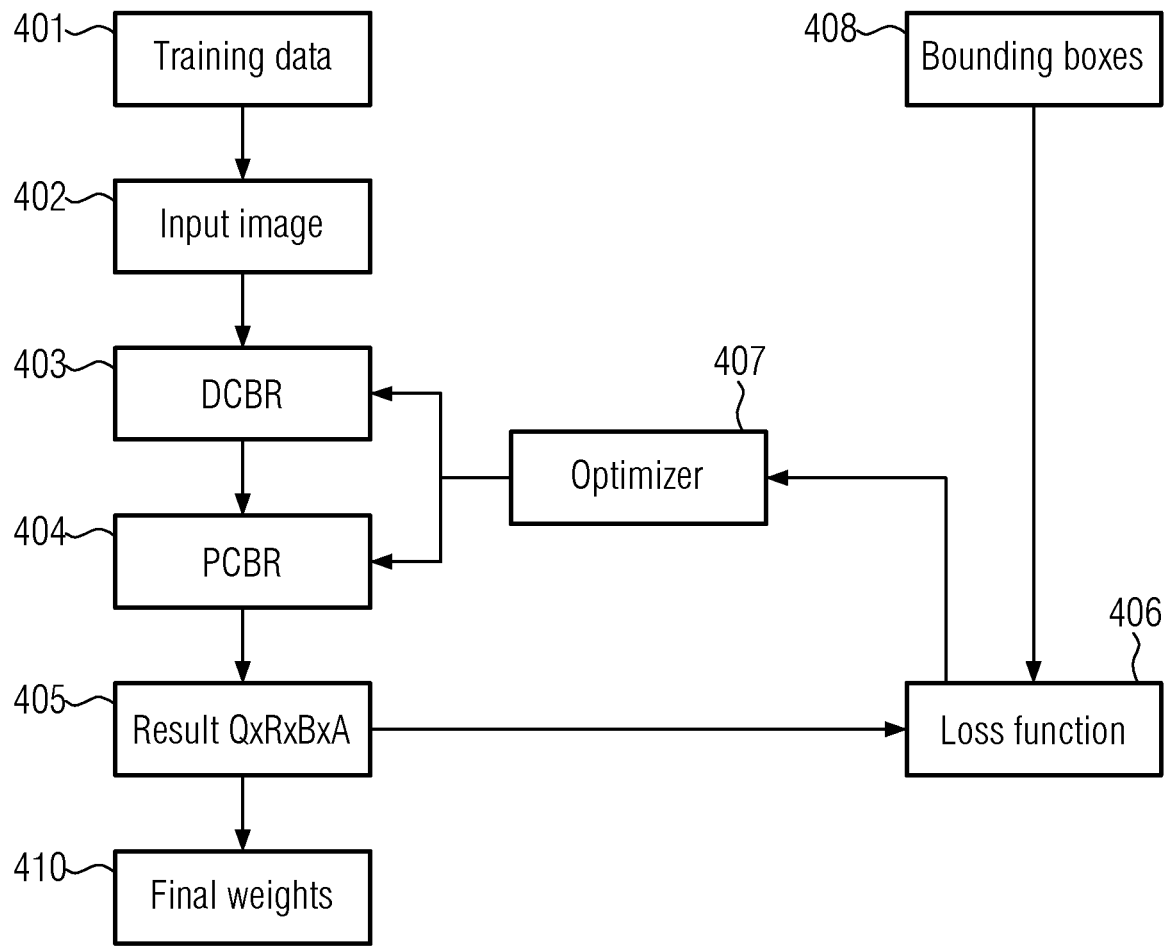
FIG. 6 shows the process of training the neural network, according to some embodiments of the present invention.

In FIG. 6, an explanation will now be given how the neural network can be properly trained such that the weights of the kernel K and the weight α explained with respect to FIG. 4 as well as the patterns that indeed identify a palm (or other object) are learned by the neural network.

It is noted that the below given examples and embodiments can also be implemented for other objects as mentioned above.

The method of FIG. 6 begins with the provision of training data 401 and preset bounding boxes 408. The training data may be constituted by a plurality of images of, for example, hands with palms or one or two eyes of a user or one or two bottoms of the feet of the user depicted in one image together with other objects. The images may be multiplied by using, from the same image, rotated, highlighted, darkened, enlarged or otherwise modified copies that are introduced as training data. The bounding boxes provided according to item 408 are bounding boxes corresponding to their respective image in the training data where those bounding boxes are the bounding boxes that are correctly associated with the object to be identified, i.e. have the correct size and the correct position and a corresponding probability value as explained with respect to FIG. 5. Such bounding boxes are provided for each and every image in the training data.

In the next step, one specific input image 402 is provided to the neural network in a training environment where, in addition to the neural network, an optimizer 407 and a loss function calculator 406 are provided.

The input image is, in a first round, processed using the depthwise convolutional layer and the first batch normalizer as well as the first rectified linear unit 403, summarized as DCBR, and is then transferred to the pointwise convolutional layer, the second batch normalizer and the second rectified linear unit, summarized as PCBR, where they are processed in line with the description given in FIG. 4. This means the steps or the sections 403 and 404 depicted in FIG. 6 are run through preferably thirteen times as described with reference to FIG. 4 using, in each section 403 and 404 the corresponding weights for the pointwise convolutional layer (PC) and the kernel K of the depthwise convolutional layer (DC). The first and second batch normalizers as well as the rectified linear units of items 403 and 404 work in the manner as explained above with respect to FIG. 5.

As a result, in line with FIG. 5, the output will be a first tensor T of size Q×R×B×A with first entries $T_{qrba}$ in line FIG. 5. This result will then be provided to the loss function where it will be compared with the preset bounding boxes in order to identify the differences between the result 405 and the correct bounding boxes obtained from 408. This difference obtained by the loss function 406 is then provided to the optimizer 407 which, in turn, will modify the weights of each pointwise convolutional layer and each depthwise convolutional layer, i.e. a and the entries in the kernel K. This means that, either for all layers in the network at once or for each layer in isolation, the weight α of the pointwise convolutional layer and the entries in the kernel K of the depthwise convolutional layer are manipulated.

With those new values, the cycle is repeated for the very same image and the resulting tensor T' with entries $T'_{qrba}$ is provided to the loss function and compared to the correct bounding boxes, the result of which being then provided to the optimizer 407 which, once again, modifies the weights.

This procedure is performed as long as the difference between the resulting tensor $T^{(n)}$ and specifically the identified bounding boxes compared to the predefined bounding boxes of item 408 exceed a given threshold which, in essence, corresponds to the identification accuracy that is intended.

After that, the next input image 402 is taken from the training data 401 and the corresponding bounding boxes are provided to the loss function. Then, the process explained is repeated again for the new image and the optimal weights for the pointwise convolutional layer and the depthwise convolutional layer are obtained. This is repeated until a specific combination of weights results in appropriate identification accuracy for all input images. The combination of weights that is then obtained is output as final weights 410.

These final weights are then introduced into the application that executes the method on the mobile device.

Therefore, the neural network that is provided to the mobile device is already fully adapted to the identification of specific objects carrying a biometric characteristic, like a palm, eye or face or bottom of a foot and can thus be employed without any further learning being required which further reduces the computer resources required at the mobile devices.

In total, by using the pointwise convolutional layers, the depthwise convolutional layers and the batch normalizers as well as the rectified linear units as explained above with reference to FIGS. 3 and 4 and by using the separation of the original image into grid cells and identifying the corresponding bounding boxes in line with the description of FIG. 3, an application can be provided that is smaller than one megabyte, thus allowing for utilization on a mobile device in isolation even without any access to additional data sources via the internet or the like. This makes it suitable for application in environments where no access to wireless networks or the like is possible. Additionally, the processor power required for running this application is reduced to a minimum while still yielding appropriate identification results of the objects discussed so far which can be used for later on performed identification of the user by the biometric characteristics associated with the respective objects, as explained previously.

The above explanations focused on images of a hand that show the side of the hand that carries the palm. However, a user might also accidently or willingly present the backhand, to the optical sensor. From such an image of a hand, a palm cannot be extracted as it is not visible.

In order to distinguish an image of a hand that carries the palm with the respective palmar creases from an image of a hand that shows not the palm but the nail or knuckles and the backhand, the following procedure can be used that can extend the above explained methods to increase the identification accuracy.

In the above examples, the bounding box was characterized by the vector $$B = \begin{pmatrix} x \\ y \\ b_f \\ h_f \\ p \end{pmatrix}$$

and the training was done using only images of hands showing the side of the hand that carries the palm.

When allowing images to be taken from both sides of the hands (i.e. the side bearing the palm and the side bearing the nail or knuckles or backhand), it is advantageous to consider two classes of objects identified in images, namely those objects that constitute hands showing palms with palmar creates and those objects that constitute hands showing the backhand.

In this case, the vector B mentioned above may be extended by one dimension c, such that $$B = \begin{pmatrix} x \\ y \\ b_f \\ h_f \\ p \\ c \end{pmatrix}$$

where c represents a so called class. A first class may represent positive identification (a palm with at least one palmar crease can be identified) and the second class may represent a negative identification (the hand shows the backside/backhand). The class may be represented by values, for example 1 for positive identification and 0 for negative identification. It is clear that, in contrast to the remaining values in the vector B, the class is a discrete value and can only take a limited number of different values corresponding to the number of classes.

The training mentioned above may then be performed in a manner that the neural network is provided with positive and negative identifications (instead of only the training data showing images with palms carrying palmar creases and bounding boxes 408) in order to be able to distinguish between images belonging either to the first or to the second class. In this context, one can imagine a plurality of images of hands that show anything but not the palm. All such "objects" may be categorized in the second class (i.e. negative identification) such that the neural network is trained to distinguish images of hands carrying the palm from "any other" images of hands. The bounding boxes provided for training will, of course, also comprise the correct class c in order to allow for properly training the network.

In order to identify all palms in an image that carry palmar creases, the process described above will neglect all bounding boxes that represent the position of a hand and which are considered to belong to the second class (i.e. negative identification), thereby preventing further processing of images or portions of images of hands that do not show the biometric characteristic (in this case, the palmar crease).

It is clear that the above concept can be applied to any other object mentioned so far, where the classes are separated in a first class showing the intended biometric characteristic (like the iris of an eye or the mouth, nose or eyes of a face) and a second class not showing the respective biometric characteristic.

Figure 7:
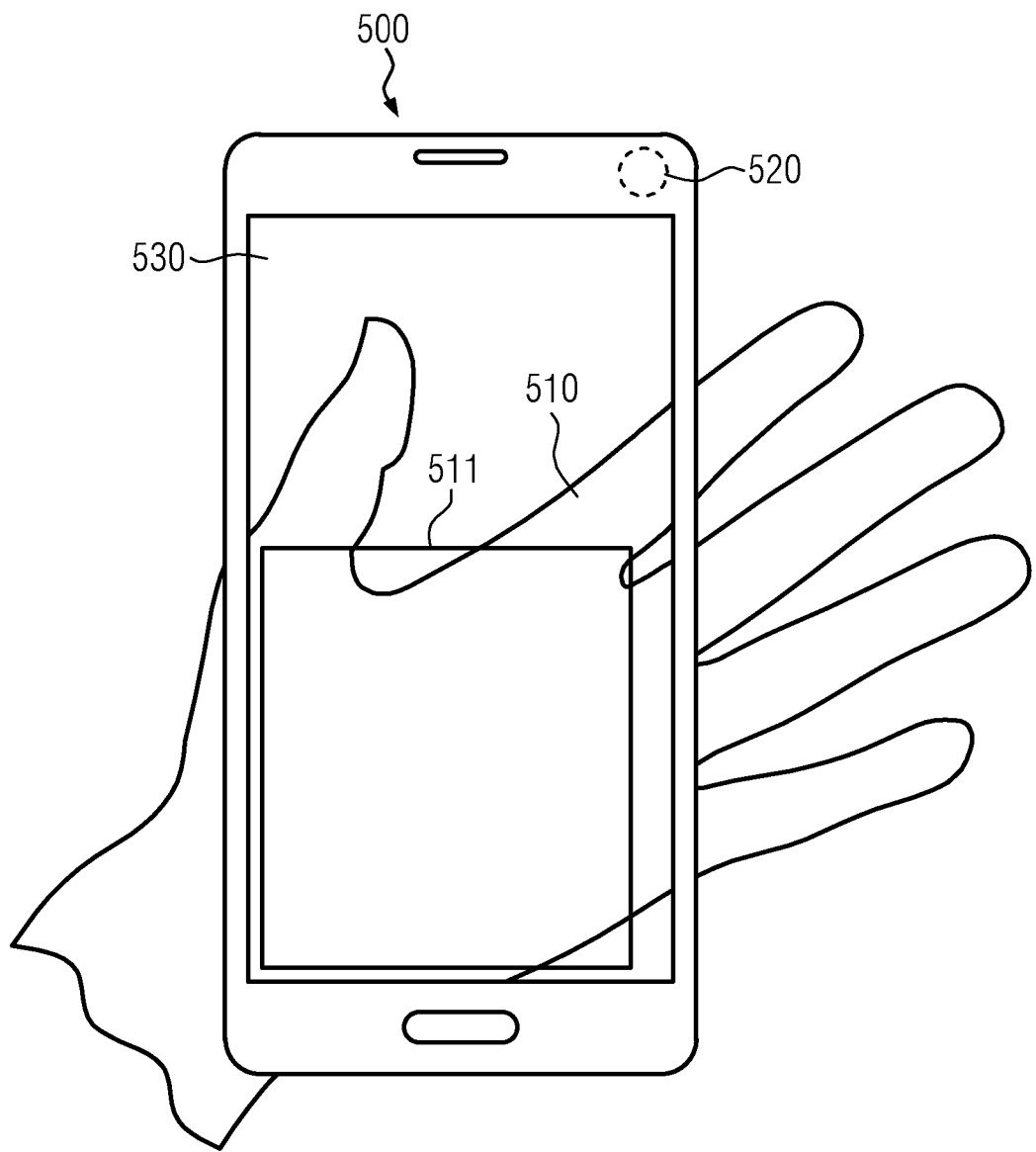
FIG. 7 shows a mobile device for obtaining an image and identifying an object within that image, according to one embodiment of the present invention.

In order to give a context where the method can be carried out, FIG. 7 depicts a mobile device in the form of a smartphone according to one embodiment of the invention.

The mobile device 500 is embodied as a smartphone as is presently known. It comprises an optical sensor 520 preferably on the backside of the camera which is opposite to the side of the mobile device 500 on which the display 530 is provided. The camera can be a camera having a resolution of 1 MP, 2 MP or even more, thus, for example an HD camera. It can be provided with a flashlight but does not need to. It can also be adapted to take real-time images with a reduced resolution and once the camera is activated, the display 530 may show a representation of what the camera actually "sees". This can be, for example, a hand 510.

In one embodiment of the invention, once the method is carried out for a taken image, the bounding box 511 identifying the palm of the hand is augmented over the image of the hand displayed on the display 530. As was further explained above, the identified bounding box or bounding boxes do not need to be displayed but can also be processed further internal to the mobile device in order to, for example, process the portions of the image that correspond to the palm such that the user is identified by identifying the palmar creases associated with the palm. This can, of course, be applied to any other object and biometric characteristic mentioned above.

What is claimed is:

1. A method comprising:
obtaining, by a processing device from an optical sensor of a mobile device, an image;
processing, by the processing device, the image by using a neural network to identify an object in the image and a position of the object in the image, thereby obtaining an identified object, wherein processing the image as input by the neural network comprises processing, by a first layer of the neural network, the input to create a first intermediate output and processing, by each following layer, an output of a preceding layer, wherein the neural network comprises a plurality of layers, each layer being a depthwise separable convolution comprising, in processing order of the input within the layer, a depthwise convolutional layer, a first batch normalizer, a first rectified linear unit, a pointwise convolutional layer, a second batch normalizer and a second rectified linear unit, and wherein by processing the input using the plurality of layers, the neural network obtains, as an output, an identification of the object and the position of the object within the image;

after processing the image, extracting, by the processing device from the identified object, a biometric characteristic; and providing, by the processing device, at least the biometric characteristic as input to determine whether the biometric characteristic identifies a user.

2. The method of claim 1, wherein:

the object is a palm of a hand of the user and the biometric characteristic is at least one palmar crease, and processing the input comprises extracting, from the palmar crease, a biometric feature associated with the palmar crease to obtain an extracted biometric feature, and comparing the extracted biometric feature to a stored biometric feature stored in a storage device to identify a difference between the extracted biometric feature and the stored biometric feature, wherein if the difference is below a threshold, the user is identified by the palmar crease and, if the difference is above the threshold, the user is not identified by the palmar crease; or the object is a face of the user and the biometric characteristic is at least one of a mouth, or a nose of the user within the face, and processing the input comprises extracting, from the biometric characteristic, a biometric feature from the mouth or the nose to obtain an extracted biometric feature, and comparing the extracted biometric feature to a stored biometric feature stored in a storage device to identify a difference between the extracted biometric feature and the stored biometric feature, wherein if the difference is below a threshold, the user is identified by the biometric characteristic and, if the difference is above the threshold, the user is not identified by the biometric characteristic; or the object is an eye of the user and the biometric characteristic is an iris of the eye of the user, and processing the input comprises extracting, from the iris, a biometric feature to obtain an extracted biometric feature, and comparing the extracted biometric feature to a stored biometric feature stored in a storage device to identify a difference between the extracted biometric feature and the stored biometric feature, wherein if the difference is below a threshold, the user is identified by the iris and, if the difference is above the threshold, the user is not identified by the iris; or the object is a bottom of a foot of the user and the biometric characteristic is a footprint of the foot, and processing the input comprises extracting, from the footprint, a biometric feature to obtain an extracted biometric feature, and comparing the extracted biometric feature to a stored biometric feature stored in a storage device to identify a difference between the extracted biometric feature and the stored biometric feature, wherein if the difference is below a threshold, the user is identified by the footprint and, if the difference is above the threshold, the user is not identified by the footprint.

3. The method of claim 1, wherein the image further comprises a second object having a second biometric characteristic, and the method further comprises identifying the position of each of the biometric characteristics in the image and using an extracted biometric feature of each of the biometric characteristics for identification of the user.

4. The method of claim 3, wherein the user is identified by:

determining that a combined identification accuracy of the biometric features of is above a given threshold; or determining that, for each object, a difference between the extracted biometric feature and a stored biometric feature of the biometric characteristic is below a threshold, and determining that each difference is below the threshold.

5. The method of claim 1, wherein the optical sensor is comprised in a camera of the mobile device.

6. The method of claim 1, wherein processing the image comprises:

separating the image into a grid comprising a plurality of grid cells, wherein at least one bounding box is created within each grid cell of the plurality of grid cells, each bounding box having a predetermined position within the grid cell and predetermined geometrical characteristics; and modifying the predetermined position and the predetermined geometrical characteristics of the bounding box to obtain a resulting bounding box, wherein the resulting bounding box has a resulting position and resulting geometrical characteristics that most closely match the position of the object, thereby identifying the position of the object.

7. The method of claim 6, wherein the predetermined position of the bounding box is calculated relative to a center of the grid cell in two dimensions and the geometrical characteristics of the bounding box comprise a height and a width of the bounding box, and wherein the bounding box is associated with a probability of the object being within the bounding box.

8. The method of claim 6, further comprising displaying the image and the resulting bounding boxes that identify the position of the object.

9. The method of claim 1, wherein processing the image comprises creating, from the image, at least one matrix I that represents a color value for each pixel in the image and providing the matrix as input to the neural network, wherein the image comprises pixels and the matrix I is a matrix comprising N×M values, wherein the entries of the matrix I are given by $I_{ij}$, where i and j are integers and i=1 ... N and j=1 ... M.

10. The method of claim 9, wherein each depthwise convolutional layer of the neural network applies a predefined kernel K to the matrix I, the predefined kernel K being a matrix of size S×T where S, T<N; S, T<M comprising entries $S_{ab}$, wherein applying the kernel to the matrix comprises calculating an inner product of the predefined kernel K with each reduced matrix R of size $(N \times M)_{S,T}$ of a matrix Z, where the matrix R has the same size as the predefined kernel K, and the matrix Z has size $(N+2P_w) \times (M+2P_h)$ and the entries of the matrix $Z_{cd}$ with c, d $\in \mathbb{N}^+$ are given by $$Z_{cd} = \begin{cases} 0 \; \forall \; c \leq P_w \\ 0 \; \forall \; c > P_w + N \\ 0 \; \forall \; d \leq P_h \\ 0 \; \forall \; d > P_h + M \\ I_{i,j} \text{ where } c = i + P_w; d = j + P_h; i = 1 \ldots N; j = 1 \ldots M \end{cases}$$

and provide a matrix P as output, wherein the matrix P has the size $(N-S+2P_w/W_w+1) \times (M-T+2P_h/W_h+1)$, where $W_w$ and $W_h$ define stride width and each entry $P_{ij}$ of the matrix P is a value of the inner product of the ij-th reduced matrix R with the kernel K, wherein the matrix P is provided as output by the depthwise convolutional layer to a first batch normalizer of the neural network.

11. The method of claim 10, wherein the sizes S and T are equal for all depthwise convolutional layers or different for at least one depthwise convolutional layer and/or at least one of the entries in the kernel $KS_{a'b'} \neq S_{a \neq a', b \neq b''}$.

12. The method of claim 9, wherein the neural network comprises a batch normalizer that provides a normalized reduced matrix P' to a rectified linear unit and the rectified linear unit applies a rectification function to each entry $P_{ij}'$ of the normalized reduced matrix P', wherein the rectification function calculates a new matrix $\overline{P}$ with entries $$\overline{P}_{ij} = \begin{cases} 0 \forall P_{ij}' < 0 \\ P_{ij}' \forall P_{ij}' \geq 0 \end{cases}$$

and the matrix $\overline{P}$ is provided as output to a pointwise convolutional layer of the neural network if the batch normalizer is a first batch normalizer and the rectified linear unit is a first rectified linear unit coupled to the pointwise convolutional layer and the first batch normalizer, or to a next layer of the neural network if the batch normalizer is a second batch normalizer and the rectified linear unit is a second rectified linear unit of the neural network coupled to a second batch normalizer; and/or
wherein the pointwise convolutional layer applies a weight to the matrix I, P, P' or $\overline{P}$ received from a preceding layer by multiplying each entry in the matrix P, P' or $\overline{P}$ with the weight α.

13. The method of claim 1, wherein each step of the method is performed on the mobile device.

14. A system comprising:
an optical sensor of a mobile device;
a processor; and
a storage unit storing executable instructions that, when executed by the processor of the mobile device, cause the processor to perform operations comprising:
obtaining, from the optical sensor, an image;
processing the image as input by using a neural network to identify a position of an object in the image and the object in the image, thereby obtaining an identified object, wherein the neural network comprises a plurality of layers, each layer being a depthwise separable convolution comprising, in processing order of the input within the layer, a depthwise convolutional layer, a first batch normalizer, a first rectified linear unit, a pointwise convolutional layer, a second batch normalizer and a second rectified linear unit;
after processing the image, extracting a biometric characteristic from the identified object; and
providing at least the biometric characteristic as input to determine whether the biometric characteristic identifies a user.

15. The system of claim 14, wherein the image further comprises a second object having a second biometric characteristic, and the operations further comprise identifying the position of each of the biometric characteristics in the image and using an extracted biometric feature of each of the biometric characteristics for identification of the user.

16. The system of claim 15, wherein the user is identified by:
determining that a combined identification accuracy of the biometric features is above a given threshold; or
determining that, for each object, a difference between the extracted biometric feature and a stored biometric feature of the biometric characteristic is below a threshold, and determining that each difference is below the threshold.

17. The system of claim 14, wherein processing the image comprises:
separating the image into a grid comprising a plurality of grid cells, wherein at least one bounding box is created within each grid cell of the plurality of grid cells, each bounding box having a predetermined position within the grid cell and predetermined geometrical characteristics; and
modifying the predetermined position and the predetermined geometrical characteristics of the bounding box to obtain a resulting bounding box, wherein the resulting bounding box has a resulting position and resulting geometrical characteristics that most closely match the position of the object, thereby identifying the position of the object.

18. The system of claim 17, wherein the predetermined position of the bounding box is calculated relative to a center of the grid cell in two dimensions and the geometrical characteristics of the bounding box comprise a height and a width of the bounding box, and wherein the bounding box is associated with a probability of the object being within the bounding box.

* * * * *